US012797766B2

(12) United States Patent
Mai et al.

(10) Patent No.: US 12,797,766 B2
(45) Date of Patent: Nov. 17, 2026

(54) READING MATERIAL SOUNDING BY INDUCTION

(71) Applicant: Leo Paper Bags Manufacturing (1982) Limited, Hong Kong (CN)

(72) Inventors: Jiajie Mai, Hong Kong (CN); Ruohua Cai, Heshan (CN); Boli Li, Heshan (CN)

(73) Assignee: Leo Paper Bags Manufacturing (1982) Limited, Hong Kong (CN)

( * ) Notice: Subject to any disclaimer, the term of this patent is extended or adjusted under 35 U.S.C. 154(b) by 169 days.

(21) Appl. No.: 18/792,001

(22) Filed: Aug. 1, 2024

(65) Prior Publication Data

US 2025/0269295 A1 Aug. 28, 2025

(30) Foreign Application Priority Data

Feb. 27, 2024 (CN) ......................... 202420371531.0

(51) Int. Cl.
*A63H 33/38* (2006.01)
*G10K 15/04* (2006.01)

(52) U.S. Cl.
CPC ............. *A63H 33/38* (2013.01); *G10K 15/04* (2013.01)

(58) Field of Classification Search
None
See application file for complete search history.

(56) References Cited

U.S. PATENT DOCUMENTS 11,623,464 B1 * 4/2023 Hightower ........... H03K 17/952 324/207.15
2002/0079908 A1 * 6/2002 Hohl .................. G01R 27/2611 324/654
2006/0082429 A1 * 4/2006 Lynch .................... A63H 33/26 335/205
2019/0232705 A1 * 8/2019 Chen ....................... G06F 3/044

FOREIGN PATENT DOCUMENTS

CN 105336225 A 2/2016
CN 110782713 A 2/2020
CN 213339187 U 6/2021
CN 214042646 U 8/2021
CN 214098740 U 8/2021

OTHER PUBLICATIONS

European search report for European family patent No. 24188076.4, mailed on Dec. 5, 2024.

* cited by examiner

*Primary Examiner* — James B Hull
(74) *Attorney, Agent, or Firm* — Grogan, Tuccillo & Vanderleeden LLP

(57) ABSTRACT

A reading material sounding by induction includes: a book body and an inductive sounding assembly. The book body is provided with an opening extending through the book body, a swingable member is arranged at the opening, and the swingable member is provided with an inner chamber communicated with the opening. The inductive sounding assembly includes an induction member, a receiving member, a power supply and a sounding unit, the induction member is arranged in the swingable member, the receiving member, the power supply and the sounding unit are all arranged in the book body, and the receiving member is electrically connected with the power supply.

8 Claims, 4 Drawing Sheets

READING MATERIAL SOUNDING BY INDUCTION

CROSS-REFERENCE TO RELATED APPLICATION

This application is based on and claims the benefit of priority from Chinese Patent Application No. 202420371531.0, filed on 27 Feb. 2024, the entirety of which is incorporated by reference herein.

TECHNICAL FIELD

The present application relates to the technical field of reading materials manufacturing, and more particularly, to a reading material sounding by induction.

BACKGROUND

Electronic books are educational materials that aid in the visual and auditory development of children. They are widely embraced by both parents and children. Currently available electronic books typically operate by pressing buttons to trigger sounds or music relevant to the content being read, enhancing the level of amusement and interaction compared to traditional reading materials. However, merely pressing buttons to play music can become monotonous, rendering the functionality of electronic books too simplistic, thereby hindering the enhancement of their amusement and interactivity.

SUMMARY

The present application aims to solve at least one of the technical problems in the existing technology. Therefore, the present application provides a reading material sounding by induction, wherein a hand of a child can extend into an inner chamber of an swingable member through an opening, and then an induction member can detect the hand of the child and emit a trigger signal, and a receiving member can trigger a sounding unit to sound after receiving the trigger signal emitted by the induction member, thus improving interactivity and amusement for the child when reading and enhancing reading sensory experience for the child.

The reading material sounding by induction provided according to some embodiments of the present application comprises: a book body and an inductive sounding assembly, wherein the book body is provided with an opening extending through the book body, a swingable member is arranged at the opening, and the swingable member is provided with an inner chamber communicated with the opening; the inductive sounding assembly comprises an induction member, a receiving member, a power supply and a sounding unit, the induction member is arranged in the swingable member; the receiving member, the power supply and the sounding unit are all arranged in the book body, the receiving member is electrically connected with the power supply, and the sounding unit is electrically connected with the receiving member; wherein, when being triggered, the induction member is capable of emitting a trigger signal, and the receiving member is capable of receiving the trigger signal to trigger the sounding unit to sound.

The reading material sounding by induction provided according to some embodiments of the present application at least has the following beneficial effects. When reading, the hand of the child can extend into the inner chamber of the swingable member through the opening, and then the induction member can detect the hand of the child and emit the trigger signal, and the receiving member can trigger the sounding unit to sound after receiving the trigger signal emitted by the induction member, thus improving interactivity and amusement for the child when reading and enhancing reading sensory experience for the child. Moreover, the hand of the child can drive the swingable member to swing as a whole, which can not only increase touch comfort of the child and enhance sensory development, but also further improve interactivity with the child.

In the reading material sounding by induction provided according to some embodiments of the present application, the swingable member is made of a soft material.

In the reading material sounding by induction provided according to some embodiments of the present application, an outer end of the swingable member is provided with a styling member.

In the reading material sounding by induction provided according to some embodiments of the present application, the swingable member is capable of being accommodated in the opening.

In the reading material sounding by induction provided according to some embodiments of the present application, a back of the book body is provided with a mounting groove, and the power supply is mounted in the mounting groove.

In the reading material sounding by induction provided according to some embodiments of the present application, a cover is arranged at the back of the book body, and the cover is configured to cover an opening of the mounting groove to limit the power supply in the mounting groove.

In the reading material sounding by induction provided according to some embodiments of the present application, a switch for controlling on-off of the power supply is arranged at the back of the book body.

In the reading material sounding by induction provided according to some embodiments of the present application, a rear side of the book body is provided with a plurality of sound outlets, and the sounding unit is arranged towards the sound outlets.

In the reading material sounding by induction provided according to some embodiments of the present application, an optical source and/or a vibrating member are/is arranged in the book body, the optical source and/or the vibrating member are/is electrically connected with the receiving member, and when the induction member is triggered, the receiving member is capable of receiving the trigger signal, to trigger the optical source and/or the vibrating member to respond.

In the reading material sounding by induction provided according to some embodiments of the present application, the inductive sounding assembly further comprises a changeover switch, the changeover switch is electrically connected to the sounding unit, and a sounding mode of the sounding unit is capable of being controlled by the changeover switch.

The additional aspects and advantages of the present application will be given in part in the following description, and will become apparent in part from the following description, or will be learned through the practice of the present application.

BRIEF DESCRIPTION OF THE DRAWINGS

The additional aspects and advantages of the present application will be more apparent and readily appreciated from the following description of the embodiments in conjunction with the accompanying drawings, wherein.

Figure 1:
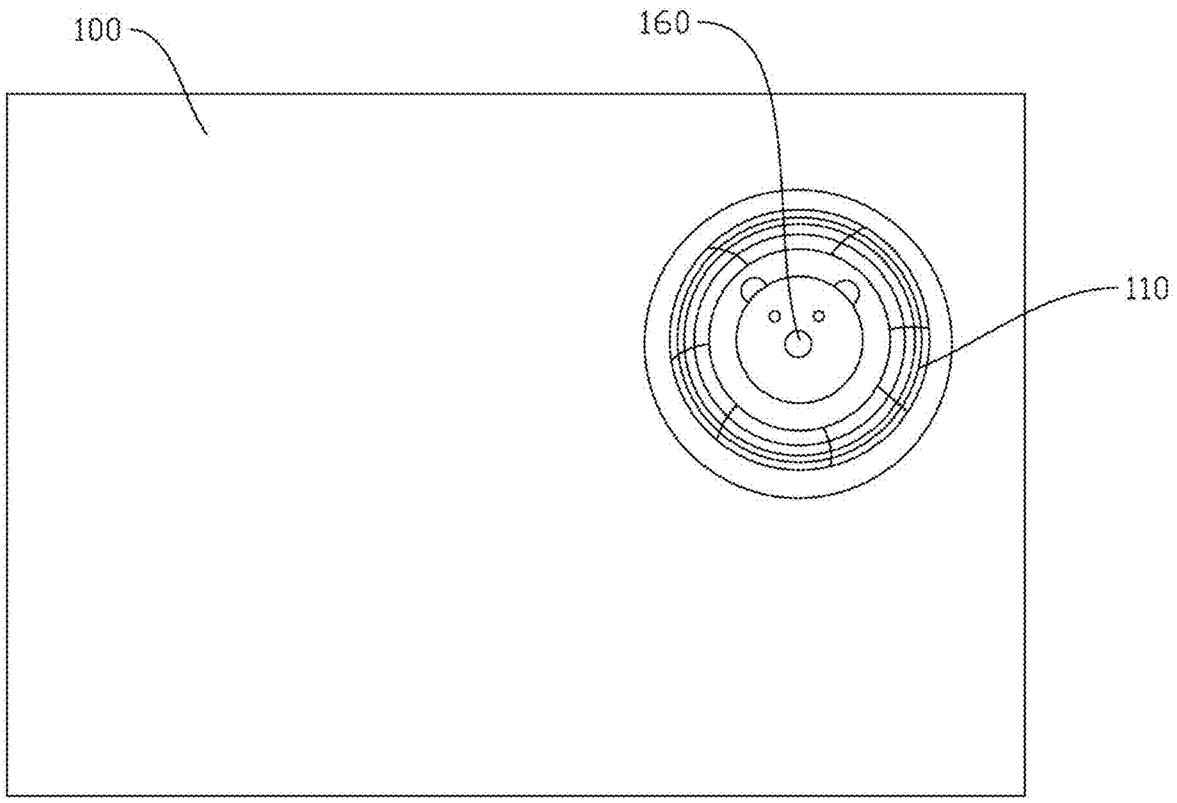
FIG. 1 is a front view of a reading material sounding by induction provided by some embodiments of the present application.
Figure 2:
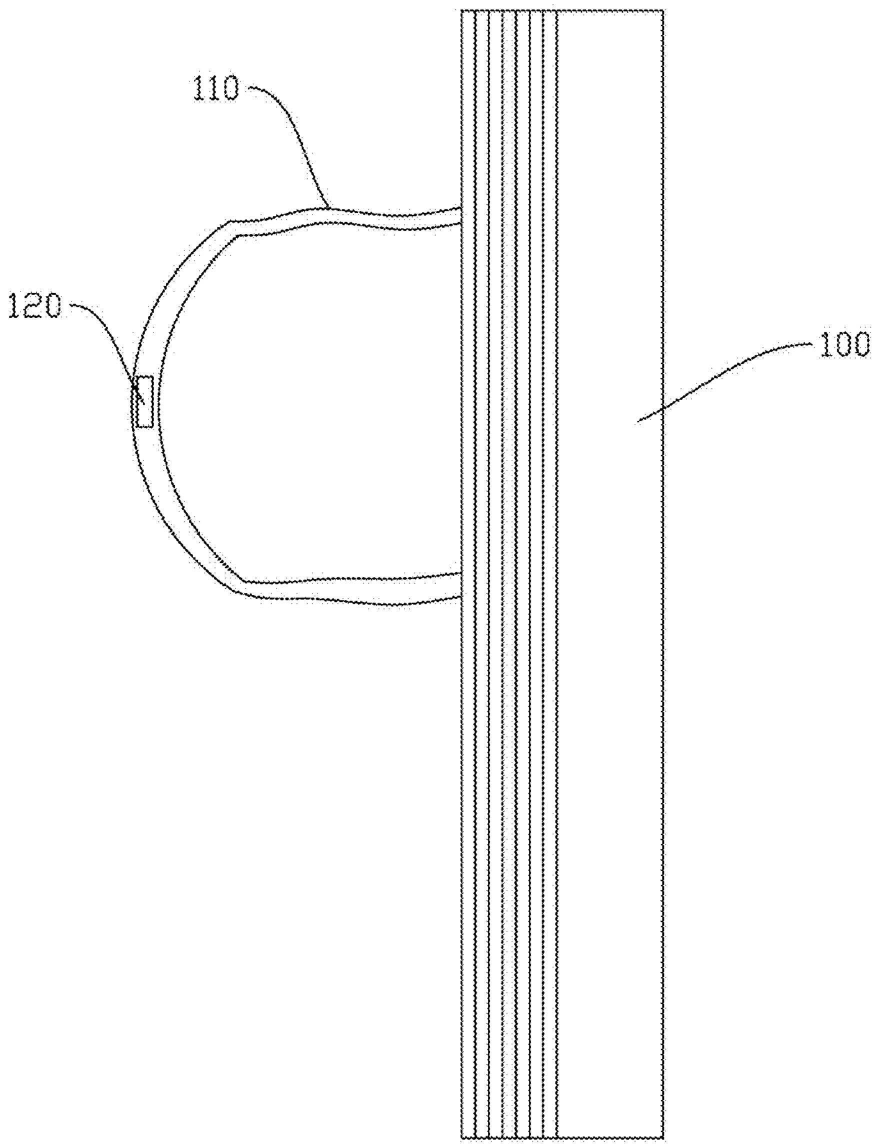
FIG. 2 is a side view of the reading material sounding by induction provided by some embodiments of the present application.

Reference numerals are as follows:

100 refers to book body; 110 refers to swingable member; 120 refers to induction member; 130 refers to receiving member; 140 refers to power supply; 150 refers to sounding unit; 160 refers to styling member; 170 refers to switch; and 180 refers to sound outlet.

DETAILED DESCRIPTION

The embodiments of the present application will be described in detail hereinafter. Examples of the embodiments are shown in the drawings. The same or similar reference numerals throughout the drawings denote the same or similar elements or elements having the same or similar functions. The embodiments described below by reference to the drawings are exemplary and are intended only to explain the present application and are not to be construed as limiting the present application.

In the description of the present application, it should be understood that the orientation or positional relationship indicated by the terms upper, lower, front, back, left and right is based on the orientation or positional relationship shown in the drawings, only for the convenience of describing the present application and simplifying the description, and does not indicate or imply that the indicated device or element must have a specific orientation, or be constructed and operated in a specific orientation. Therefore, the terms should not be construed as limiting the present application.

In the description of the present invention, the terms such as first and second if described are used for the purpose of distinguishing the technical features only, and cannot be understood as indicating or implying relative importance, or implicitly indicating the number of technical features indicated thereby, or implicitly indicating the order of technical features indicated thereby.

In the description of the present application, unless otherwise explicitly defined, words such as setting, mounting and connecting should be understood in a broad sense, and those skilled in the art can reasonably determine the specific meanings of the above words in the present application in combination with the specific contents of the technical solutions.

Electronic books are educational materials that aid in the visual and auditory development of children. They are widely embraced by both parents and children. Currently available electronic books typically operate by pressing buttons to trigger sounds or music relevant to the content being read, enhancing the level of amusement and interaction compared to traditional reading materials. However, merely pressing buttons to play music can become monotonous, rendering the functionality of electronic books too simplistic, thereby hindering the enhancement of their amusement and interactivity.

In order to solve this problem, the embodiments of the present application provide a reading material sounding by induction. A hand of a child can extend into an inner chamber of an swingable member through an opening, and then an induction member 120 can detect the hand of the child and emit a trigger signal, and a receiving member 130 can trigger a sounding unit 150 to sound after receiving the trigger signal emitted by the induction member 120, thus improving interactivity and amusement for the child when reading and enhancing reading sensory experience for the child. The specific structures and functions of the reading material sounding by induction provided by the embodiments of the present application will be further explained below with reference to the words and drawings.

Referring to FIG. 1 to FIG. 4, the reading material sounding by induction provided according to some embodiments of the present application comprises a book body 100 and an inductive sounding assembly, wherein the book body 100 is provided with an opening extending through the book body, an swingable member 110 capable of swinging is arranged at the opening, and the swingable member 110 is provided with an inner chamber communicated with the opening. The inductive sounding assembly comprises an induction member 120, a receiving member 130, a power supply 140 and a sounding unit 150. The induction member 120 is arranged in the swingable member 110. The receiving member 130, the power supply 140 and the sounding unit 150 are all arranged in the book body 100. The receiving member 130 is electrically connected with the power supply 140, and the sounding unit 150 is electrically connected with the receiving member 130. When being triggered by a hand of a child, the induction member 120 can emit a trigger signal, and the receiving member 130 can receive the trigger signal to trigger the sounding unit 150 to sound.

In the reading material sounding by induction provided according to some embodiments of the present application, when reading, the hand of the child can extend into the inner chamber of the swingable member 110 through the opening, and then the induction member 130 can detect the hand of the child and emit the trigger signal, and the receiving member 130 can trigger the sounding unit 150 to sound after receiving the trigger signal emitted by the induction member 120, thus improving the interactivity and amusement for the child when reading and enhancing the reading sensory experience for the child. Moreover, the hand of the child can drive the swingable member 110 to swing as a whole, which can not only increase the touch comfort of the child and enhance the sensory development, but also further improve the interactivity with the child.

It can be understood that the reading material sounding by induction may be not only the book body, but also a greeting card, a puzzle, a calendar, a wall calendar, a packaging box, and the like.

It should be noted that one or more induction members 120 may be provided. When multiple induction members 120 are provided, the number of the swingable members 110 may also be multiple. The multiple swingable members 110 may be arranged at different positions, and one or more induction members 120 may be arranged in each swingable member 110. The reading material sounding by induction may also comprise an external remote controller, and different modes can be controlled through the cooperation of the remote controller and the receiving member 130, so that the sounding unit 150 can emit different sounds.

According to some other embodiments of the present application, multiple swingable members 110 may be provided. The multiple swingable members 110 may be arranged at different positions of the book body 100, and one or more induction members 120 may be arranged in each swingable member 110, each swingable member 110 can be provided with the induction member 120, and each induction member 120 can trigger the same or different modes.

In the reading material sounding by induction provided according to some embodiments of the present application, the swingable member 110 is made of a soft material, and the swingable member 110 made of the soft material has a good touch, which can give the child a better touch experience.

It should be noted that the soft material may be cloth, rubber, EVA, sponge, cotton, nylon, hemp, leather, pure wool, rayon, silk, bamboo charcoal fiber, chemical spinning fiber, elastic fiber, acetate fiber, polyester fiber, textile, man-made fiber and the like alone or in combination.

Referring to FIG. 1, in the reading material sounding by induction provided according to some embodiments of the present application, an outer end of the swingable member 110 is provided with a styling member 160. The styling member 160 may swing with the swingable member 110 when the child swings the swingable member 110, which is beneficial to improving the interest.

It should be noted that the styling member 160 may be a doll (such as a bear, a dragonfly, and the like). The styling member 160 may also be various stickers and the like. The specific form and the specific shape of the styling member 160 are not limited here.

Referring to FIG. 1, in the reading material sounding by induction provided according to some embodiments of the present application, the swingable member 110 is capable of being accommodated in the opening. The swingable member 110 can be entirely accommodated in the opening of the book body 100 when not in use, which is convenient for accommodation.

Figure 3:
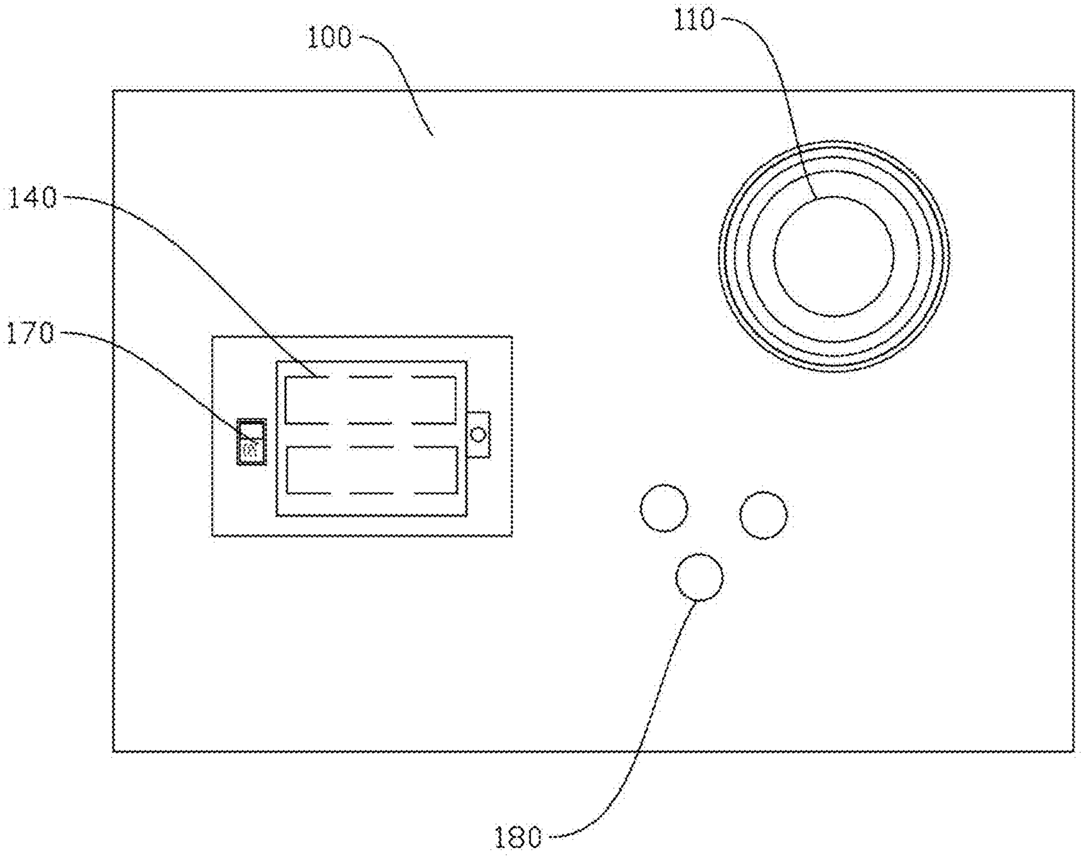
FIG. 3 is a schematic diagram showing a back structure of the reading material sounding by induction provided by some embodiments of the present application.
Figure 4:
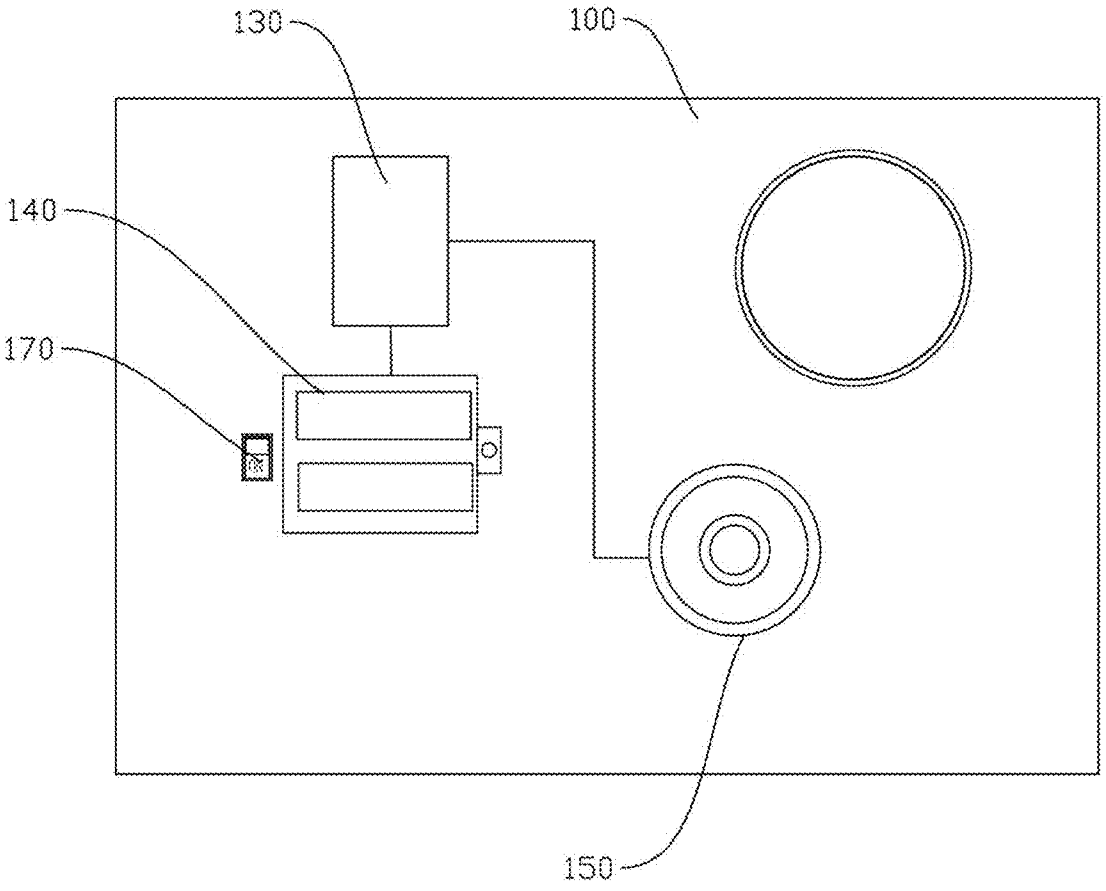
FIG. 4 is a schematic diagram showing an internal structure of the reading material sounding by induction provided by some embodiments of the present application.

Referring to FIG. 3 and FIG. 4, in the reading material sounding by induction provided according to some embodiments of the present application, a back of the book body 100 is provided with a mounting groove, and the power supply 140 is mounted in the mounting groove. The power supply 140 is fixed in a stable and reliable way, and an outside of the book body 100 can be kept flat, which is convenient for transportation and accommodation.

Referring to FIG. 3 and FIG. 4, in the reading material sounding by induction provided according to some embodiments of the present application, a cover is arranged at the back of the book body 100, and the cover is configured to cover an opening of the mounting groove to limit the power supply 140 in the mounting groove. The cover can protect the power supply 140 in the sealed groove while fixing the power supply 140, and can prevent the power supply 140 from being damaged due to bumping during transportation or use.

Referring to FIG. 3 and FIG. 4, in the reading material sounding by induction provided according to some embodiments of the present application, a switch 170 for controlling on-off of the power supply 140 is arranged at the back of the book body 100. The on-off of the power supply 140 can be controlled by toggling the switch 170, which is convenient for users to cope with different scenarios. Referring to FIG. 3, in the reading material sounding by induction provided according to some embodiments of the present application, a rear side of the book body 100 is provided with one or more sound outlets 180, and the sounding unit 150 is arranged towards the sound outlets 180, so that the sound of the sounding unit 150 can be clearly transmitted to the outside through the sound outlets 180, which is beneficial to improving the use experience for the child.

In the reading material sounding by induction provided according to some embodiments of the present application, an optical source and/or a vibrating member (not shown in the figure) are/is arranged in the book body 100. The optical source and/or the vibrating member are/is electrically connected with the receiving member 130. When the induction member 120 is triggered by the hand of the child, the receiving member 130 can receive the trigger signal to trigger the optical source and/or the vibrating member to respond. The response of the optical source and/or the vibrating member can further improve the interactivity with the child and enhance the amusement for the child when reading.

In the reading material sounding by induction provided according to some embodiments of the present application, the inductive sounding assembly further comprises a changeover switch (not shown in the figure). The changeover switch is electrically connected to the sounding unit 150, and a sounding mode of the sounding unit 150 is capable of being controlled by the changeover switch. With the cooperation of the changeover switch and the sounding unit 150, different sounding scenarios can be simulated, which is beneficial to improving the amusement for the child when reading.

It should be noted that the optical source may be an LED lamp and can emit different colors of light. The reading material sounding by induction may be provided with one or more modes, and different modes for the reading material sounding by induction can be adjusted by the changeover switch, so that the sounding unit 150 can make different sounds and the optical source can emit different colors of light.

The embodiments of the present application have been described in detail above with reference to the drawings, but the above embodiments are only used to illustrate, but are not intended to limit the technical solutions of the present application. The present application is not limited to the above embodiments, and various changes can be made within the knowledge of those of ordinary skills in the art without departing from the purpose of the present application.

What is claimed is:

1. A reading material sounding by induction, comprising:

a book body, provided with an opening extending through the book body, wherein a swingable member made of a soft material is arranged at the opening, and the swingable member is provided with an inner chamber communicated with the opening, wherein an outer end of the swingable member is provided with a styling member; and an inductive sounding assembly, comprising an induction member, a receiving member, a power supply and a sounding unit, wherein the induction member is arranged in the swingable member; the receiving member, the power supply and the sounding unit are all arranged in the book body, the receiving member is electrically connected with the power supply, and the sounding unit is electrically connected with the receiving member;

wherein, the inner chamber is configured to receive a hand of a user extending through the opening, such that the induction member is capable of detecting the hand of the user, when being triggered, the induction member is capable of emitting a trigger signal, and the receiving member is capable of receiving the trigger signal to trigger the sounding unit to sound.

2. The reading material sounding by induction according to claim 1, wherein the swingable member is capable of being accommodated in the opening.

3. The reading material sounding by induction according to claim 1, wherein a back of the book body is provided with a mounting groove, and the power supply is mounted in the mounting groove.

4. The reading material sounding by induction according to claim 3, wherein a cover is arranged at the back of the book body, and the cover is configured to cover an opening of the mounting groove to limit the power supply in the mounting groove.

5. The reading material sounding by induction according to claim 3, wherein a switch for controlling on-off of the power supply is arranged at the back of the book body.

6. The reading material sounding by induction according to claim 3, wherein a rear side of the book body is provided with a plurality of sound outlets, and the sounding unit is arranged towards the sound outlets.

7. The reading material sounding by induction according to claim 1, wherein an optical source and/or a vibrating member are/is arranged in the book body, the optical source and/or the vibrating member are/is electrically connected with the receiving member, and when the induction member is triggered, the receiving member is capable of receiving the trigger signal, to trigger the optical source and/or the vibrating member to respond.

8. The reading material sounding by induction according to claim 1, wherein the inductive sounding assembly further comprises a changeover switch electrically connected to the sounding unit, and a sounding mode of the sounding unit is capable of being controlled by the changeover switch.

* * * * *